Patented Aug. 23, 1938

2,127,844

UNITED STATES PATENT OFFICE 2,127,844

DOUBLE SILICATES OF ZIRCONIUM AND METHODS OF MAKING SAME

Charles J. Kinzie, Niagara Falls, N. Y., assignor to The Titanium Alloy Manufacturing Company, New York, N. Y., a corporation of Maine No Drawing. Application June 12, 1934, Serial No. 730,265

4 Claims. (Cl. 23—110)

My invention relates more particularly to improved methods of making double silicates of zirconium that I have found to be of great advantage in the manufacture of enamels and glazes, in which such improved double silicates of zirconium are used as opacifiers, as well as in the manufacture of paints and lacquers in which such novel double silicates of zirconium are employed as pigments.

Zircon ($ZrSiO_4$) has useful properties as a constituent of protective coatings, such as vitreous enamels as well as paint and lacquer coatings made with organic vehicles. I have found, however, that $ZrSiO_4$ is rather difficult to reduce to such a degree of fineness as required for pigment purposes, especially for those applications in which the vehicle and pigment are ground together in an iron mill, in which case any residual gritty abrasive particles in the zircon will be likely to wear off enough iron to discolor the paint or other coating.

It is also true that zircon is of a very refractory nature as regards heat and response to chemical action, which tends in ceramics to retard the reactions necessary in order that the zirconium may have its desired effect in combination with other materials employed in forming the ceramic coatings.

I have discovered that by first converting the zircon ($ZrSiO_4$) by heat in a dry way to a double silicate, the compounds formed are free of the objectionable abrasive properties inherent in zircon, and also that the double silicates so formed are less refractory as compared with the $ZrSiO_4$ and then combine more readily with other ceramic materials to produce the desired effects.

In ceramics as well as in the paint industry, lead compounds such as litharge, PbO, minium $Pb_3O_4$, and white lead (basic lead carbonate), all have useful properties. For instance, in the paint industry the property of a very high specific gravity permits of making paints with a high pigment content while in ceramics the lead compounds are very active fluxes. In either industry there exists, however, the objectionable feature that the lead compounds in present day use are readily soluble in human system, and when taken into the system by breathing paint or ceramic sprays, etc., lead poisoning may result.

By combining the lead with zirconium as basic as well as normal lead zirconium silicate, a paint pigment results having a high specific gravity and low oil absorption. Paints made therefrom can be heavily loaded with pigment and I believe that the lead zirconium combination which is relatively more inert in comparison with lead oxides and carbonates will present considerably less hazard to workers engaged in use and application thereof; in ceramics the useful fluxing action of lead may be combined with the useful properties of zirconium in one compound, while reducing the hazard incidental to use of lead compounds.

In the case of zinc compounds these also are relatively soluble, and in paints the zinc tends to be acted on by weathering agents, and finally forms soluble compounds which are washed away. By combining the zinc with zirconium as zinc zirconate or as zinc zirconium silicate, a more stable zinc pigment is produced.

Zinc is frequently used in ceramics in the oxide form, for example, in vitreous enamels. A small amount will increase the lustre when added to the mill, while in glazes for clay bodies zinc is a fairly good flux and tends to enhance the brightness of glazes. There exists the objectionable feature, however, that zinc oxide tends to promote crawling or parting of the film during drying and firing operations. By means of my new and improved zinc and zirconium combination, zinc zirconate as well as zinc zirconium silicate, the crawling objection to zinc is overcome while at same time producing the beneficial effects of both the zinc and the zirconium compounds in the resulting wares.

The alkaline earth carbonates, such as $BaCO_3$, $CaCO_3$, $MgCO_3$, $SrCO_3$, have the objectionable feature in ceramics of evolving volumes of $CO_2$ incidental to firing operation in glazes, etc. By combining these compounds with zirconium as alkaline earth zirconates, and particularly alkaline earth zirconium silicate, products are formed which may be added at the mill, and by this means the useful properties of the alkaline earth fluxes are obtained along with the strength imparting, opacifying and color stabilizing effects of zirconium, all combined in one product without the harmful evolution of gases during the firing operation.

Alkali-metal carbonates represent the usual source of sodium, potassium, lithium, etc. for ceramics, but in either enamels or glazes these compounds are water-soluble and must first be combined with certain of the other constituents to form a relatively less soluble compound or glass which may then be used as the source of the alkali-metal compound.

By dry-reacting alkali-metal compounds with zirconium to form an alkali-metal zirconate and especially an alkali-metal zirconium silicate, the useful effects of the alkali-metal and the zirconium are obtained in a water-insoluble compound addition at the mill without resort to the usual fritting or partial fritting operation.

These compounds, particularly the double silicates mentioned form useful cements as for example, temperature cements which are less refractory than $ZrSiO_4$ and will upon heating sinter or fuse to bind the bricks, etc. between which the cement is placed; the various combinations of zirconium and silicon with alkaline earths and alkali metals form a temperature cement range from about 700° C. up to about 2000° C.

Another feature of this cement phase which has useful applications is that based on the quick setting of the double silicate compounds by reaction with acid, for instance, by wetting with phosphoric or sulphuric acid which upon drying tends to react and set the cement into a hard bonding mass.

The novel double silicate of zirconium compounds are relatively free of the gritty properties of zircon, while at the same time they are crystalline in structure so as to form useful polishing agents. Hence the various altered zircons or double silicates of zirconium present a wide range of properties for the polishing field.

Some of these compounds, particularly the double silicates of zinc and those of calcium or of magnesium, should prove of use as cosmetic pigments as these are non-toxic, relatively inert and soft products of good pigmenting value.

Certain of the compounds, such as for instance lead and barium zirconium silicates, may also be useful as insecticides and fungicides.

The products of my invention are therefore of dual interest in paints and in ceramics and also form useful cements and mild polishing compounds as well as possessing possibilities by way of application along other lines.

In order that the nature of my invention may be understood a series of illustrative examples will be set forth to show how these new products may be obtained by following the various procedures described. I have found that the compounds of the metals which will effectively react with the zirconium silicate are the bi-valent oxides and carbonates of lead, zinc and the alkaline earth-metals, and have so designated same in the appended claims. The amounts of these compounds of the metals used as reagents in the charge vary from that required to combine theoretically with the zircon to form the normal double silicate of zirconium with the metal used, down to amounts as shown in the "basic" examples to form a complex consisting of the normal silicate, zirconium oxide and some residual zircon together with other substances that can not be identified with certainty. The resulting product as a basic double silicate consists of a mixture or complex and is not a definite chemical compound. The temperatures employed in these examples are sufficiently high to secure a substantially complete reaction of the ingredients of the charge in which the zircon is decomposed, but without fusion of such ingredients, and the products are in the form of finely-divided pigment particles.

*Example A.—Lead zirconium silicate ($PbZrSiO_5$)*

BATCH WEIGHTS 500 parts by weight of $ZrSiO_4$ —325 mesh or 45.09%
608.95 parts by weight of PbO or 54.91%

A charge of these ingredients of such batch is intimately mixed either by wet milling with water to a slip, which is then dried, or by means of an initial rough dry mixing, followed by passing the mix through a disintegrating or fine dry milling machine to bring the particles of $ZrSiO_4$ and PbO into intimate contact.

The charge is preferably formed into bricks by dry or damp press method in preparation for heating. The bricks are then heated at about 800° C. to form lead zirconium silicate ($PbZrSiO_5$). In order to prepare the double silicates for use, the product is then milled preferably with water to the desired fineness which is readily done since the compound formed is easily reduced to a fine state of sub-division. The milled product is then dried.

This lead zirconium silicate has approximately the following composition

| | Percent |
|---|---|
| Lead (calculated as PbO) | 54.91 |
| Zirconium (calculated as $ZrO_2$) | 30.31 |
| Silica (calculated as $SiO_2$) | 14.78 |
| | 100.00 |

Crystals of this product are lath shaped with extinction inclined to the long axis at 30° to 32°, with indistinct cleavage.

The index of refraction of these crystals is a little below 1.85 with birefringence of about .002. The crystals however are too fine to determine other optical properties. The particles vary in size from less than 0.5 micron to about 60 microns with the average approximately 5 to 7 microns.

This new product may consist of a mixture of zirconium oxide crystals, a glassy matrix and a moderate amount of $Pb_2SiO_4$ along with the third crystalline material lead zirconium silicate. The zirconium oxide can be either free or dispersed in the $Pb_2SiO_4$, or may be dispersed in the lead zirconium silicate crystals. There should be no free lead or free zircon remaining in this product. The color of finished product which is a normal double silicate will vary with amount of impurities present, but usually is either cream or ivory color.

*Example B.—Basic lead zirconium silicate*

By basic, we mean a silicate that contains less of PbO—CaO—ZnO—MgO—BaO—SrO than is required to form the normal double silicate. When a basic double silicate is made, it will contain some of the normal double silicate, possibly some glass with $ZrO_2$ dispersed either in the glass or in normal double silicate, or even in a third silicate that would form with PbO—CaO—ZnO—MgO—BaO—SrO and $SiO_2$, and will contain more free zircon as the percentages of these oxides decrease. In the formation of the basic double silicate, products are made that are more suited for certain uses than the normal double silicates.

BATCH WEIGHTS 500 parts by weight of $ZrSiO_4$ —325 mesh or 75%
166 parts by weight of PbO or 25%

The method of mixing, preparation for heating, temperature of formation, and final preparation are same as described in Example A.

The product made in this Example B has approximately the following composition:

| | Percent |
|---|---|
| Lead (calculated as PbO) | 25 |
| Zirconium (calculated as $ZrO_2$) | 50 |
| Silica (calculated as $SiO_2$) | 25 |
| | 100 |

This product contains all the constituent minerals or crystals that the normal lead zirconium silicate contains plus an excess of zircon with about the same amount of $Pb_2SiO_4$ and less $ZrO_2$.

The index of refraction of these crystals is about 1.90. Particles vary in size from less than 0.5 micron to about 60 microns with the average approximately 5 to 7 microns. Particle sizes may vary because they depend largely on milling. This Example B product is considerably lighter in color when contrasted with that of Example A. Although the microscope identifies some free $ZrSiO_4$, this has apparently been so altered probably at the surface that the product as a whole is free of the grittiness and harshness of finely milled zircon from which it was made.

Similarly products can be made with less PbO and with more PbO than is set forth in this example, for instance, PbO 10%, $ZrO_2$ 60% and $SiO_2$ 30%. Generally I prefer the products containing less lead than in Example A, and the lead may be varied from about 55% PbO to 10% PbO; of course more or less could be used if such products were desired.

*Example C.—Zinc zirconium silicate ($ZnZrSiO_5$)*

BATCH WEIGHTS

| | Percent |
|---|---|
| 500 parts by weight of $ZrSiO_4$ —325 mesh | 69.25 |
| 222 parts by weight of ZnO | 30.75 |

This charge is prepared as described in Example A, except that the charge is heated at about 2200° F. to form zinc zirconium silicate ($ZnZrSiO_5$). The product is then milled as in Example A.

Zinc zirconium silicate so produced has approximately the following composition:

| | Percent |
|---|---|
| Zinc (calculated as ZnO) | 30.748 |
| Zirconium (calculated as $ZrO_2$) | 46.557 |
| Silica (calculated as $SiO_2$) | 22.693 |
| | 99.998 |

The crystals are monoclinic of perfect prismatic cleavage and good basal cleavage, and are colorless to reddish brown and non-pleochroic. Twinning occurs along the axis and is present in almost every crystal. The index of refraction of these crystals is about 1.81.

This product may be composed of a small amount of glass and a very small amount of $ZrO_2$ with the major constituent being a monocinic crystal. Particle sizes of this product will depend largely upon fineness of milling.

*Example D.—Basic zinc zirconium silicate*

BATCH WEIGHTS

| | Percent |
|---|---|
| 500 parts by weight of $ZrSiO_4$ —325 mesh | 80 |
| 125 parts by weight of ZnO | 20 |
| | 100 |

This charge is prepared as described in Example A, except that it is heated at about 2200° F.; milling of product is the same as in Example A, and such product has approximately the following composition:

| | Percent |
|---|---|
| Zinc (calculated as ZnO) | 20 |
| Zirconium (calculated as $ZrO_2$) | 53.6 |
| Silica (calculated as $SiO_2$) | 26.4 |
| | 100.0 |

This product is a mixture of two crystalline substances in a small amount of glassy matrix. There is more glass in this basic double silicate than in the normal double silicate with considerable amounts of $ZrO_2$. The crystals appear to be polyhedral hexagonal structure rather than monoclinic, and have good pyramidal cleavage. The index of refraction of these crystals is about 1.81. Particle sizes of this product will also depend upon fineness of milling.

Products with more zinc than in Example C and with less zince than in Example D may be made; also, of course, products within the range of Examples C and D.

For instance, in certain cases a reacted product may contain about

| | Percent |
|---|---|
| ZnO | 60 |
| $ZrO_2$ | 27 |
| $SiO_2$ | 23 |
| | 100 |

Such product forms a useful pigment in paints and as an opacifier flux in glazes, while one containing

| | Percent |
|---|---|
| ZnO | 10 |
| $ZrO_2$ | 60 |
| $SiO_2$ | 30 |
| | 100 | is useful where a dense paint pigment is required, or in ceramics in cases where a relatively large amount of zirconium is needed along with a small amount of zinc.

*Example E.—Calcium zirconium silicate*

BATCH WEIGHTS

| | Percent |
|---|---|
| 500 parts by weight of $ZrSiO_4$ —325 mesh | 64.66 |
| 273 parts by weight of $CaCO_3$ | 35.34 |
| | 100.00 |

A charge consisting of the above ingredients is prepared as described in Example A. Prepared product is heated at about 2250° F. and milled as described in Example A.

Calcium zirconium silicate so formed has approximately the following composition:

| | Percent |
|---|---|
| Calcium (calculated as CaO) | 23.4 |
| Zirconium (calculated as $ZrO_2$) | 51.50 |
| Silica (calculated as $SiO_2$) | 25.1 |
| | 100.00 |

This product is composed of minute crystals of $ZrO_2$ dispersed in a glass of 1.690 ±.01 varying slightly in different parts. If this product is heated to about 2500° F., it will be completely converted to Wollastonite ($CaSiO_3$) and $ZrO_2$ with just a trace of glassy matrix.

My experiments have not resulted in production of a double silicate of calcium and zirconium, but rather a composition of calcium silicate and $ZrO_2$. Calcium apparently behaves differently as compared with barium.

Nevertheless both the $CaCO_3$ and $ZrSiO_4$ have been so altered as to produce a useful product for use in ceramics where calcium and zirconium are required, and such product is a good source for the flux calcium, also for the opacifier and color stabilizer zirconium as well as for silica needed.

*Example F.—Basic calcium zirconium silicate*

BATCH WEIGHTS

| | Per cent |
|---|---|
| 500 parts by weight of $ZrSiO_4$ —325 mesh | 75 |
| 166 parts by weight of $CaCO_3$ | 25 |

A charge consisting of above ingredients is prepared as described in Example A. Prepared product is heated at above 2250° F. and milled as described in Example A.

Such basic calcium zirconium silicate so formed has approximately the following composition:

| | Per cent |
|---|---|
| CaO | 15.70 |
| $ZrO_2$ | 56.10 |
| $SiO_2$ | 28.20 |
| | 100.00 |

This product in the form of a basic calcium zirconium silicate is composed of a mixture of $CaSiO_3$, $ZrO_2$ and zircon crystals with a little glass matrix. The $CaSiO_3$ is a little off in index of refraction, and seems to contain some excess of $SiO_2$ in solution.

*Example G.—Magnesium zirconium silicate ($MgZrSiO_5$)*

BATCH WEIGHTS

| | Per cent |
|---|---|
| 500 parts by weight of $ZrSiO_4$ —325 mesh | 68.49 |
| 230 parts by weight of $MgCO_3$ | 31.51 |
| | 100.00 |

A charge consisting of the above is prepared as described in Example A. Prepared product is heated at about 2250° F. and milled as described in Example A.

Such magnesium zirconium silicate so formed has approximately the following composition:

| | Per cent |
|---|---|
| Magnesium (calculated at MgO) | 18.03 |
| Zirconium (calculated at $ZrO_2$) | 55.11 |
| Silica (calculated as $SiO_2$) | 26.86 |
| | 100.00 |

Crystals of this product have the following optical properties: Uniaxial with distinct basal cleavage and imperfect prismatic cleavage. The index of refraction of these crystals shows L=1.88+) (=1.91.

Besides the crystals of $MgZrSiO_5$, there are crystals of $ZrO_2$ which are dispersed throughout the mass and included in the crystals of $MgZrSiO_5$. The product is composed of a mixture of these two crystalline materials, the major constituent being $MgZrSiO_5$.

This product may be used as a source of magnesium zirconium and silicon compounds in enamels and glazes, and is a useful addition at the mill as an opacified and adjusting agent to vary the expansion of glazes and enamels. It is lower in specific gravity as compared with lead or barium combinations and should also prove useful in paints.

*Example H.—Basic magnesium zirconium silicate*

BATCH WEIGHTS

| | Per cent |
|---|---|
| 500 parts by weight of $ZrSiO_4$ —325 mesh | 74.63 |
| 170 parts by weight of $MgCO_3$ | 25.37 |
| | 100.00 |

A charge consisting of the above is prepared as described in Example A. Prepared product is heated at about 2250° F. and milled as described in Example A, and such basic magnesium zirconium silicate has approximately the following composition.

| | Per cent |
|---|---|
| Magnesium (calculated as MgO) | 13.98 |
| Zirconium (calculated as $ZrO_2$) | 57.83 |
| Silica (calculated as $SiO_2$) | 28.18 |
| | 99.99 |

This product consists of about 5% $ZrO_2$, 18–20% zircon; the remaining portion is uniaxial having one index of about 1.88± and the other about 1.91—. Very little cleavage shows in this sample, but it appears to be basal and prismatic and otherwise very similar to the crystals in the normal $MgZrSiO_5$.

Although this product still contains some $ZrSiO_4$, it is apparent that the surfaces of these remaining $ZrSiO_4$ particles have been so changed, or else reduced in size, that same no longer constitute a source of grit objectionable in paint making.

*Example I.—Barium zirconium silicate ($BaZrSiO_5$)*

BATCH WEIGHTS 500 parts by weight of $ZrSiO_4$ —325 mesh
538.4 parts by weight of $BaCO_3$.

A charge consisting of the above is prepared as described in Example A. Prepared product is heated at about 2350° F. to form barium zirconium silicate ($BaZrSiO_5$). It is milled as described in Example A.

This barium zirconium silicate so formed has approximately the following composition:

| | Per cent |
|---|---|
| Barium (calculated as BaO) | 45.6 |
| Silica (calculated as $SiO_2$) | 17.8 |
| Zirconium (calculated as $ZrO_2$) | 36.6 |
| | 100.00 |

Crystals of this product are isotropic, crystallize in cubic system, but are sometimes elongated to form prisms. Cleavage is indistinct, but tends to be both cubic and octohedral with an index of refraction approximately 1.85.

This product may be a mixture of two crystalline materials bonded by a small amount of glass of R. I. of 1.615±. One crystalline material may be $ZrO_2$ and the other $BaZrSiO_5$, the latter being preponderant in amount and $ZrO_2$ probably less than 10% of total.

Barium is a useful flux in enamels and glazes; in enamels it cannot be added at the mill due to the fact that upon heating and reaction, it yields $CO_2$ gas which would bubble the surface; when added at the batch and smelted $BaCO_3$ tends to froth badly and usually it is none too easy to combine. By use of my barium zirconium silicate the barium may be used at the mill in case of enamels and glazes to obtain the benefits of barium as well as zirconium.

*Example J.—Basic barium zirconium silicate*

BATCH WEIGHTS

| | Per cent |
|---|---|
| 500 parts by weight of $ZrSiO_4$ —325 mesh | 75 |
| 166 parts by weight of $BaCO_3$ | 25 |

A charge consisting of the above is prepared as described in Example A. Prepared product is heated to about 2350° F. and milled as described in Example A. Such basic barium zirconium silicate so formed has approximately the following composition:

| | Per cent |
|---|---|
| Barium (calculated as BaO) | 20.61 |
| Zirconium (calculated as ZrO$_2$) | 53.4 |
| Silica (calculated as SiO$_2$) | 26.0 |
| | 100.01 |

This material consists of four materials to wit: Crystals of what appears to be barium zirconium silicate, residual zircon, zirconium oxide and some glass-like material.

*Example K.—Strontium zirconium silicate (SrZrSiO$_5$)*

BATCH WEIGHTS

| | Per cent |
|---|---|
| 500 parts by weight of ZrSiO$_4$ —325 mesh | 55.49 |
| 401.06 parts by weight of SrCO$_3$ | 44.51 |
| | 100.00 |

A charge consisting of the above is prepared as described in Example A. Prepared product is heated to about 2250° F. and milled as described in Example A.

This strontium zirconium silicate (SrZrSiO$_5$) so formed has approximately the following composition:

| | Per cent |
|---|---|
| Strontium (calculated as SrO) | 36.12 |
| Zirconium (calculated as ZrO$_2$) | 42.95 |
| Silica (calculated as SiO$_2$) | 20.93 |
| | 100.00 |

This normal strontium zirconium silicate is a mixture of a crystal (though possibly more than one kind though not distinguishable as all are very fine) in a glass. The glass has an R. I. of about 1.80±, while the crystal is about 2.1. It has a different shape from ZrO$_2$ as all of these crystals are definitely prisms elongated almost to the extent of being fibers. Probably they are SrO.ZrO$_2$ etc. rather than ZrO$_2$.

*Example L.—Basic strontium zirconium silicate*

BATCH WEIGHTS

| | Per cent |
|---|---|
| 500 parts by weight of ZrSiO$_4$ —325 mesh | 75 |
| 166 parts by weight of SrCO$_3$ | 25 |

A charge consisting of the above is prepared as described in Example A. Prepared charge is heated to about 2250° F. and milled as described in Example A.

Such basic strontium zirconium silicate so formed has approximately the following composition:

| | Per cent |
|---|---|
| Strontium (calculated as SrO) | 18.97 |
| Zirconium (calculated as ZrO$_2$) | 54.48 |
| Silica (calculated as SiO$_2$) | 26.54 |
| | 99.99 |

This basic strontium zirconium silicate consists of a mixture of glass of index of refraction of about 1.68±, Sr$_2$SiO$_4$, ZrO$_2$ and a third crystal which may be SrO; it is not possible to tell definitely. The glass phase is the largest, the ZrO$_2$ second, and the Sr$_2$SiO$_4$ is small. The unknown is only very small portion.

Alkali-metal compounds, such as Na$_2$CO$_3$ may be used to alter and decompose the zircon and to make same less refractory etc. as will now be described in the following examples.

*Example M*

100 parts ZrSiO$_4$ —325 mesh
17.2 parts Na$_2$CO$_3$ are intimately mixed and heat-reacted at temperatures of about 950–1100° C., milled with water, leached to remove small amount soluble materials, yielding a soft light color pigment essentially free of the abrasive properties of ZrSiO$_4$ and approximately of the following composition:

| | Per cent |
|---|---|
| Sodium (calculated as Na$_2$O) | 10 |
| Zirconium (calculated as ZrO$_2$) | 60.0 |
| Silicon (calculated as SiO$_2$) | 30 |
| | 100.0 |

There may be in this product surface altered particles of ZrSiO$_4$ crystals of Na$_2$ZrSiO$_5$ and some free ZrO$_2$, particularly the latter will be present if the temperature of reaction is much above 950° C.

*Example N*

100 parts ZrSiO$_4$ —325 mesh
25 parts lithium carbonate (Li$_2$CO$_3$)

are intimately mixed and reacted at about 800–1000° C., leached with water and dried. The product can be used to supply lithium to enamels and glazes and is essentially free of the gritty properties of ZrSiO$_4$ so that it may be used in place of the other double silicates or admixed with same.

Similarly altered zircon products may be made by heat reacting with potassium carbonate, caesium carbonate, etc.

In all the foregoing examples the ZrSiO$_4$ has been a pure product containing but small amounts of impurities so that light-colored products may result. However, it would be entirely within the scope of my invention to use a ZrSiO$_4$ containing appreciable amounts of commingled impurities such as monazite, rutile, ilmenite, etc., provided the resultant discoloration will not be objectionable for the uses intended.

I could use zirconium ores such as one containing about

50% ZrO$_2$
40% ZrSiO$_4$
10% impurities such as free silica, clay, TiO$_2$, Fe$_2$O$_3$ etc.

The double silicates and basic silicates may, of course, be made by intimately mixing and dry reacting of the separate oxides, ZrO$_2$, SiO$_2$ with the flux to yield similar products, but this is of only theoretical interest as ZrSiO$_4$ is much the lower priced material.

In the calculated composition of various products no account has been taken of small amounts impurities in the ZrSiO$_4$ or in the various fluxing compounds.

The zircon used was refined zircon containing approximately

| | Per cent |
|---|---|
| ZrO$_2$ | 65.00 |
| SiO$_2$ | 34.00 |
| TiO$_2$ | 0.10 |
| Fe$_2$O$_3$ | 0.10 |
| Others Al$_2$O$_3$ | 0.80 |
| | 100.00 |

In some instances it may be desirable to wash the milled product with water before drying to remove small amounts water-soluble salts.

My improved products, excepting those of lead combination, are white to cream white in color, while basic lead zirconium silicate is of a decided yellowish tone and normal lead zirconium silicate is quite yellow.

Mention has been made of pressing mixture into bricks prior to heating. This allows of stacking charge in a kiln leaving space between bricks to permit heat to penetrate. Reactions have been made by heating loose material in crucibles and on open hearths with stirring, the reactions appear to proceed more rapidly when charge is compacted. The charge could be extruded damp into rods of suitable size and heated or can be shaped otherwise. The charges are dry-reacted and not fused.

I have also produced lead and zinc zirconates that are useful ceramics as well as for pigments for paints and lacquers, and the following examples will illustrate this feature of my invention.

*Example O.—Lead zirconate ($PbZrO_3$)*

| | Parts by weight |
|---|---|
| PbO | 178 |
| $ZrO_2$ | 99 | were intimately mixed and then heated at 800° C. for ten hours, wet-milled with water, and dried to produce a yellowish colored pigment consisting of lead zirconate ($PbZrO_3$) which contained approximately:

| | Percent |
|---|---|
| PbO | 64 |
| $ZrO_2$ | 36 |
| | 100 |

*Example P.—Zinc zirconate ($ZnZrO_3$)*

| | Parts by weight |
|---|---|
| Zinc oxide | 407 |
| $ZrO_2$ | 616 | were intimately mixed, and then heated to 1250–1280° C. for two hours. The product consisted mainly of one crystal phase, probably $ZnZrO_3$. This material was wet milled with water and dried to produce the zinc zirconate pigment and contained approximately:

| | Percent |
|---|---|
| ZnO | 40 |
| $ZrO_2$ | 60 |
| | 100 |

I claim as my invention:

1. The method of making a double silicate of zirconium which consists in heating a charge composed of finely-milled zirconium silicate and zinc oxide at temperatures below fusion but sufficiently high to secure a substantially complete reaction and decomposition of the zirconium silicate to form a zinc zirconium silicate ($ZnZrSiO_5$).

2. The method of making a double silicate of zirconium which consists in heating a charge composed of finely-milled zirconium silicate and zinc oxide at about 2200° F. to secure a substantially complete reaction and decomposition of the zirconium silicate to form a zinc zirconium silicate ($ZnZrSiO_5$).

3. As a new article, an unfused zinc zirconium silicate ($ZnZrSiO_5$) comprising a monoclinic crystalline product having a refractive index of about 1.81 and consisting of zirconium silicate chemically combined with zinc oxide in calculated oxide percentages approximately as follows: zinc oxide 31%; zirconium oxide 46%; and silica 23%.

4. A crystalline unfused zinc zirconium silicate having high opaquing values.

CHARLES J. KINZIE.